(12) United States Patent
Kollner

(10) Patent No.: US 6,553,721 B1
(45) Date of Patent: Apr. 29, 2003

(54) DOOR WITH SUPPORT PANEL FOR ELECTRICAL COMPONENTS

(75) Inventor: Harald Kollner, Altenstadt (DE)

(73) Assignee: Meritor Automotive GmbH, Frankfurt (DE)

( * ) Notice: Subject to any disclaimer, the term of this patent is extended or adjusted under 35 U.S.C. 154(b) by 0 days.

(21) Appl. No.: 09/705,505

(22) Filed: Nov. 3, 2000

(51) Int. Cl.⁷ .................................................. B60J 5/04
(52) U.S. Cl. ...................................................... 49/502
(58) Field of Search ...................... 49/502; 296/146.5, 296/146.1

(56) References Cited

U.S. PATENT DOCUMENTS

| | | | | |
|---|---|---|---|---|
| 4,815,984 A | * | 3/1989 | Sugiyama et al. | 439/211 |
| 5,092,647 A | * | 3/1992 | Ueda et al. | 296/146.1 |
| 5,588,260 A | * | 12/1996 | Suzuki et al. | 49/502 |
| 5,716,044 A | * | 2/1998 | Peterson et al. | 49/502 |
| 5,931,682 A | * | 8/1999 | Takiguchi et al. | 49/502 |
| 6,079,764 A | * | 6/2000 | Suzuki et al. | 49/502 |
| 6,139,088 A | * | 10/2000 | Okamoto et al. | 49/502 |
| 6,312,046 B1 | * | 11/2001 | Sora et al. | 296/146.1 |

* cited by examiner

*Primary Examiner*—Jerry Redman
(74) *Attorney, Agent, or Firm*—Carlson, Gaskey & Olds

(57) ABSTRACT

In a vehicle door with a door body (10) and a support panel (20) for electrical components, a plug-in connector (22) is provided for electrically connecting said components to an external electrical line. The support panel (20) can be inserted into or can be mounted to cover an opening (18) of the door body (10) in a way which allows that the plug-in connector (22) is accessible from an outer surface of the door body (10) for a plug-in connection to said external electrical line. In order to simplify assembling of the door body and the support panel, the plug-in connector (22) is fastened permanently to the support panel (20) on its inward-facing side and its insertion port or mouth (22A) is oriented toward the outer side of the door body and, therein, toward an entry opening (24) for the plug-in end of the external electrical line.

6 Claims, 1 Drawing Sheet

DOOR WITH SUPPORT PANEL FOR ELECTRICAL COMPONENTS

This application claims priority to German Patent application number 29919500.7 filed on Nov. 5, 1999.

BACKGROUND OF THE INVENTION

The invention pertains to a door, in particular, a vehicle door, with a door body and a support panel for electrical components.

Vehicle doors are increasingly equipped with electrical components such as lamps, loudspeakers, electric door locks or window lifts (regulators) and the like. Such components are, at least in part, preassembled on a support panel that can be inserted into an opening of the door body or can cover such an opening. To this end, the door body has a cavity in which the components are accommodated.

For the connection of such electrical components to an external electrical line, such as a power supply line or a data line, it is a known measure to install (mount or fix) a plug-in connector in the door body such that the external electrical line, whose end has 8 corresponding plug piece (male or female) which can be inserted from the outside into the plug-in connector. Such a connector is usually provided on an end face on the hinge side so that it is covered with the door closed. This plug connector must be electrically connected via, a wire harness to the support panel or to the electrical components thereon. It is customary to preassemble the support panel with all electrical components, the wire harness and the plug connector suspended from it, and then to insert the panel into the opening of the door body (DE-C-35 29 660, FIG. 32). In this maneuver, the plug-in connector being suspended from the end of the wire harness must additionally be guided through the opening of the door body into the door cavity and from there into an opening of the outer door shell and put in place in the outer door shell. The simultaneous handling of the support panel and the plug-in connector requires a great deal of dexterity and can be accomplished by one person only with effort.

It is also known to have a door module sheet with a plug-in cable connector being mounted at an extension arm and to fit said connector within a recess in the door body (DE-A-19 72 1452). Again, this maneuver is a combined one, which does not allow to concentrate on the mounting of the door module only but requires extra attention for fitting the plug-in cable connector, which is positioned at the end of its flexible support arm, into the plug receiving recess in the door body.

SUMMARY OF THE INVENTION

Staring from here, the invention is solving the problem of simplifying the installation of the support panel in the door body. According to the invention, therefore, the wire harness is dispensed with and the plug connector is fastened permanently to the inward-facing side of the support panel, being oriented such that an electrical plug connection to an external electrical line is possible through an entry hole or opening in the door body. For the installer of the support panel, the separate maneuvering of the plug connector arid its fastening to the outer shell of the door body is completely eliminated. The aforementioned components to be used according to the invention, as well as those claimed and/or described in the example of an embodiment, are not subject to any special exceptional conditions in regard to their size, shape, material selection and technical conception, so that the known selection criteria in the respective field of application can be applied without restrictions, within the scope of the claims.

BRIEF DESCRIPTION OF THE DRAWINGS

Additional details, features and advantages of the object of the invention can be seen from the subclaims as well as from the description below of the associated drawing, in which a preferred embodiment of the vehicle door is represented for the sake of example.

The sole figure shows part of a vehicle door schematically, in horizontal section.

DETAILED DESCRIPTION OF THE PREFERRED EMBODIMENT

Figure 1:
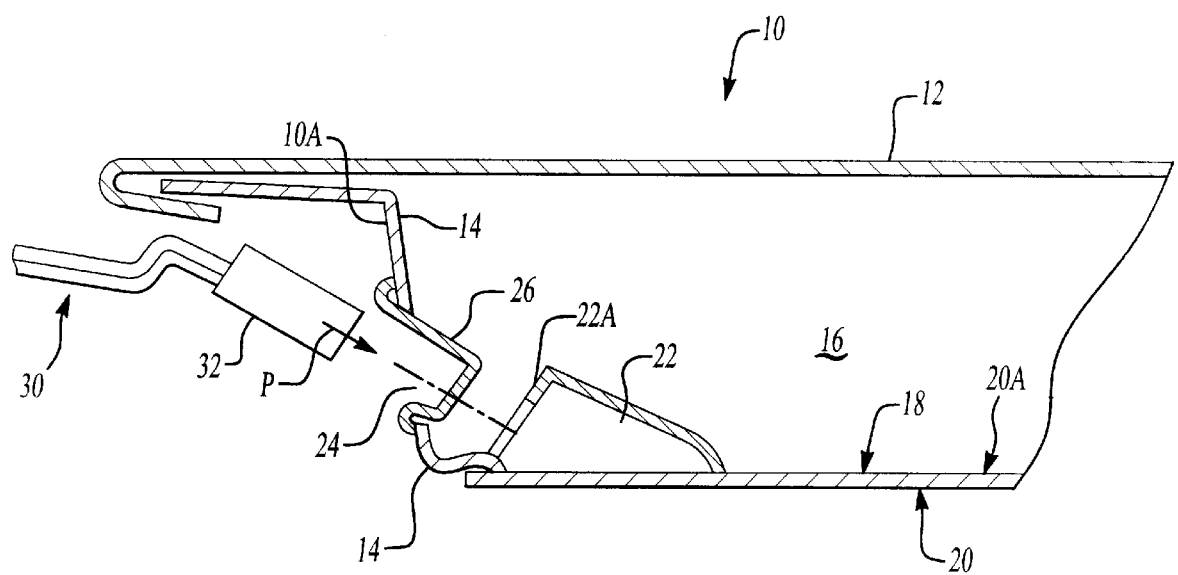

The door body 10, constructed from an outer panel 12 and an inner panel 14, forms a cavity 16, which has a large opening 18 on the inside of the door and offers a place to accommodate electrical components, not specifically represented in the figure. Serving to accommodate these electrical components is a support panel 20, which closes off the opening 18 and can be, in particular, detachably fastened at its edges to the inner panel 14. On its side 20A facing the cavity 16, the support panel 20 may bear both, the electrical components and said plug-in connector 22 belonging to them. The latter is firmly connected to the support panel. Its insertion mouth or orifice 22A is pointed towards an end face area 10A of the door body 10. A plugging direction p is thereby defined. An entry opening 24 in the inside panel 14 of the door body 10 is provided that is aligned with this insertion direction P. This entry opening is equipped, as shown in the drawing and in that sense preferred, with a rosette seal 26 which permits a peripherally sealed insertion of a corresponding plug-in connector (male piece) 32 at the end of an external electrical line 30 into the plug-in connector 22 of the support panel 20. For this it is not required that the insertion orifice 22A of the plug-in connector 22 extend up into the entry opening 24 in the inner panel 14, although that is possible. While a diagonally running insertion direction p is provided in the drawing, this is by no means compulsory. Rather, the plug-in connector 22 can also be oriented at other angles to the outside of the door body 10.

What is claimed is:

1. Door, in particular vehicle door, with a door body (10) and a support panel (20) including electrical components and a plug-in connector (22) for electrical connection of the components to an external electrical line, said support panel (20) attached to an opening (18) of the door body (10) and the plug-in connector (22) is accessible from an outer surface of the door body (10) when said support panel (20) is mounted to said door body (10), said door characterized by the plug-in connector (22) fastened permanently to the support panel (20) on an inward-facing side and an insertion orifice (22A) oriented toward the outer side of the door body and therein toward an entry opening (24) for the plug-in end of the external electrical line.

2. A door according to claim 1, characterized in that an insertion direction for the plug-in connector runs diagonally between the inside of the door and an end face of the door.

3. A door according to claim 1, characterized in that a rosette seal is inserted into said entry opening of the door body for the external electrical line.

4. A vehicle door assembly comprising:

a door body including an end face;

a support panel mounted to said door body;

an electrical component mounted to said support panel and extending into said door body, said electrical component including a plug-in connector orientated toward an opening in said end face of said door body;

and a connector of an external electrical line extends through said opening to connect to said plug-in connector.

5. The assembly of claim 4, wherein said plug-in connector is orientated transversely relative to said end face of the door body.

6. The assembly of claim 4, wherein said plug in connector is orientated diagonally relative to said and face of the door body.

* * * * *

UNITED STATES PATENT AND TRADEMARK OFFICE
CERTIFICATE OF CORRECTION

PATENT NO. : 6,553,721 B1
DATED : April 29, 2003
INVENTOR(S) : Harald Kollner

It is certified that error appears in the above-identified patent and that said Letters Patent is hereby corrected as shown below:

Column 2,
Line 41, "Door, in particular vehicle door" should be -- A vehicle door --.

Column 4,
Line 2, "and" should be -- end --.

Signed and Sealed this

Nineteenth Day of August, 2003

JAMES E. ROGAN
*Director of the United States Patent and Trademark Office*